US010609183B2

(12) United States Patent
Thomée et al.

(10) Patent No.: US 10,609,183 B2
(45) Date of Patent: Mar. 31, 2020

(54) CONTENT SHARING RECOMMENDATIONS

(71) Applicant: Oath Inc., New York, NY (US)

(72) Inventors: Bart Thomée, San Francisco, CA (US); Ioannis Kalantidis, San Francisco, CA (US); David Ayman Shamma, San Francisco, CA (US); Andrew Douglas Stadlen, San Francisco, CA (US); Daniel Jeffrey Tasse, San Francisco, CA (US); Austin William Shoemaker, San Francisco, CA (US)

(73) Assignee: Oath Inc., New York, NY (US)

( * ) Notice: Subject to any disclaimer, the term of this patent is extended or adjusted under 35 U.S.C. 154(b) by 179 days.

(21) Appl. No.: 15/134,633

(22) Filed: Apr. 21, 2016

(65) Prior Publication Data
US 2017/0310789 A1    Oct. 26, 2017

(51) Int. Cl.
*H04L 29/08* (2006.01)
*H04L 12/58* (2006.01)
*H04W 4/12* (2009.01)
*H04W 4/02* (2018.01)
*H04W 4/18* (2009.01)
*H04W 4/21* (2018.01)
*G06F 16/9535* (2019.01)
*G06F 17/27* (2006.01)

(52) U.S. Cl.
CPC ........ *H04L 67/327* (2013.01); *G06F 16/9535* (2019.01); *G06F 17/2785* (2013.01); *H04L 51/14* (2013.01); *H04L 51/32* (2013.01); *H04L 67/06* (2013.01); *H04W 4/023* (2013.01); *H04W 4/12* (2013.01); *H04W 4/185* (2013.01); *H04W 4/21* (2018.02)

(58) Field of Classification Search
CPC ............................. H04L 67/327; H04L 51/32
See application file for complete search history.

(56) References Cited

U.S. PATENT DOCUMENTS

| 8,601,019 | B1* | 12/2013 | Weininger | ........ G06F 16/90324 707/769 |
| 8,700,653 | B2* | 4/2014 | Hansson | ............ G06Q 30/0275 707/767 |
| 2010/0180217 | A1* | 7/2010 | Li | ........................ H04L 12/1818 715/758 |
| 2011/0208822 | A1* | 8/2011 | Rathod | ............... G06F 16/9535 709/206 |

(Continued)

*Primary Examiner* — Uzma Alam
(74) *Attorney, Agent, or Firm* — Cooper Legal Group, LLC

(57) ABSTRACT

One or more computing devices, systems, and/or methods for providing content sharing recommendations are provided. For example, signals, associated with a user (e.g., a location of the user, an event occurring near the user, an activity being performed by the user, content of a message recently received by the user or being composed by the user, etc.), are evaluated to identify a context associated with the user (e.g., the user may be composing a social network post about a basketball game that the user is attending). The context is applied to content (e.g., photos, videos, documents, webpages, etc.), available to the user, to create contextualized content indicative of how appropriate or relevant such content is given the context (e.g., a basketball game photo may be more relevant than a work document). A content sharing recommendation of contextualized content may be provided to the user.

20 Claims, 10 Drawing Sheets

(56) References Cited

U.S. PATENT DOCUMENTS

| | | | |
|---|---|---|---|
| 2014/0074629 A1* | 3/2014 | Rathod | G06Q 10/10 |
| | | | 705/14.73 |
| 2014/0149399 A1* | 5/2014 | Kurzion | G06F 16/9535 |
| | | | 707/723 |
| 2015/0006241 A1* | 1/2015 | Jamal | G06F 16/9535 |
| | | | 705/7.29 |
| 2015/0199763 A1* | 7/2015 | Birkhead | G06Q 40/06 |
| | | | 705/36 R |
| 2016/0014059 A1* | 1/2016 | Rathod | H04L 12/1818 |
| | | | 715/752 |
| 2016/0381163 A1* | 12/2016 | Mashtakov | H04L 67/1097 |
| | | | 709/205 |
| 2017/0048184 A1* | 2/2017 | Lewis | H04L 51/10 |
| 2017/0068683 A1* | 3/2017 | Bakshi | G06F 16/90324 |
| 2017/0242898 A1* | 8/2017 | Su | G06F 16/951 |

\* cited by examiner

CONTENT SHARING RECOMMENDATIONS

BACKGROUND

Many users may share information and content through various communication mediums. In an example, a user may post a vacation photo to a social network to share with friends. In another example, users may express their thoughts through a microblogging service. In another example, users may share messages, images, videos, and/or other files through emails. In this way, users may communicate using email, text messages, instant messages, social network blogs, etc.

Certain information and/or content may be more or less relevant, appropriate, and/or interesting to share based upon a current context associated with a user. For example, if the user is composing an email to a friend while on vacation, a vacation photo may be more appropriate to share with the friend than if the user were composing an email to a work manager. In another example, if the user captures famous landmark photos and photos of local family owned craft shops that are off the beaten track, then the famous landmark photos may be more appropriate to send to the user's parents who have never seen such landmarks, while the photos of the local family owned craft shops may be more appealing to an artistic friend that routinely visits where the user is on vacation and thus has seen the landmarks several times already but not yet the local family owned craft shops.

SUMMARY

In accordance with the present disclosure, one or more computing devices and/or methods for providing content sharing recommendations are provided. In an example, signals may be analyzed to identify a context associated with the user. In an example, the signals may comprise a current user location signal (e.g., locational information, of a device carried by the user, corresponding to a location of a football stadium that is indicative of the user walking into the football stadium), an event occurrence signal (e.g., a news event content provider may indicate that a championship football game is occurring today in a city in which the football stadium is located, which is a threshold distance from a current location of the user; a news story within a social network post that a groundhog just saw its shadow and retreated back into its den may have a relatedness to a career attribute of the user above a relatedness threshold because the user is a weatherman on a television station; an Olympic swimming event, described through a microblog, may have a relatedness to a hobby attribute of the user above a relatedness threshold because a social network profile of the user indicates that the user is an avid swimmer; etc.), a current user activity signal (e.g., the user uses a mobile device to pay for a chilidog; an accelerometer of the mobile device indicates that the user is driving; a calendar entry indicates that the user is to meet a friend for dinner; a camera and microphone of the mobile device indicate that the user is in a loud and busy restaurant; etc.), a time signal (e.g., a current time corresponding to a halftime of the championship football game), and/or a variety of other information (e.g., subject matter features, proper nouns, and/or other information extracted from a message, being composed by the user, using text recognition functionality such as natural language processing functionality, optical character recognition functionality, etc.; features such as an activity, a person, or a location depicted by a photo taken by the user; information about users in a contact list of the user; etc.). For example, the signals may indicate that the user is watching a championship football game, has taken many photos of the halftime show, and just bought a chilidog, and thus the context may indicate that the user might want to share information about the championship football game with friends such as a high quality photo of the halftime show.

The context may be applied to a set of content, available to the user, to create a set of contextualized content. Applying the context to the set of content will provide an indication as to how appropriate certain content and/or recipients are for the particular context (e.g., an inferred relevancy of content given a current situation and a particular recipient). In an example, a contextual relevancy may comprise a ranking metric as to how appropriate, interesting, and/or relevant certain content is to a particular recipient under the context of the user. For example, a friend may have messaged the user about the halftime show, and thus photos of the halftime show may be more relevant for responding to the friend than photos of the chilidog or a video of the user sitting in traffic trying to get to the stadium. In another example, the user may be writing a message "remember when we used to eat chilidogs all the time . . . " to a second friend, and thus the photo of the chilidog may be more relevant to share with the second friend. The set of content may comprise photos, videos, audio recordings, links, articles, documents, files, a social network post, webpages, a social network profile, a map, a location, and/or any other data that may be accessible to the user (e.g., stored on a local device such as a mobile phone being carried by the user, on a remote device such as a work laptop, or available from an external source such as a website or content provider).

Responsive to contextualized content, having a contextual relevancy exceeding a threshold (e.g., the chilidog photo is more relevant, interesting, and/or appropriate content for the message being composed to the second friend than other content), a content sharing recommendation for content of the contextualize content may be constructed. In this way, the content sharing recommendation of the content may be provided to the user for sharing with a recipient, such as the second user. In an example, the content may be located within one or more devices that are remote to a current device on which the user is composing the message, and thus the content may be retrieved from such devices (e.g., content may be aggregated across different devices). Content sharing recommendations may be locally constructed, constructed by a remote server, or constructed by a mesh of devices such as devices owned by the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
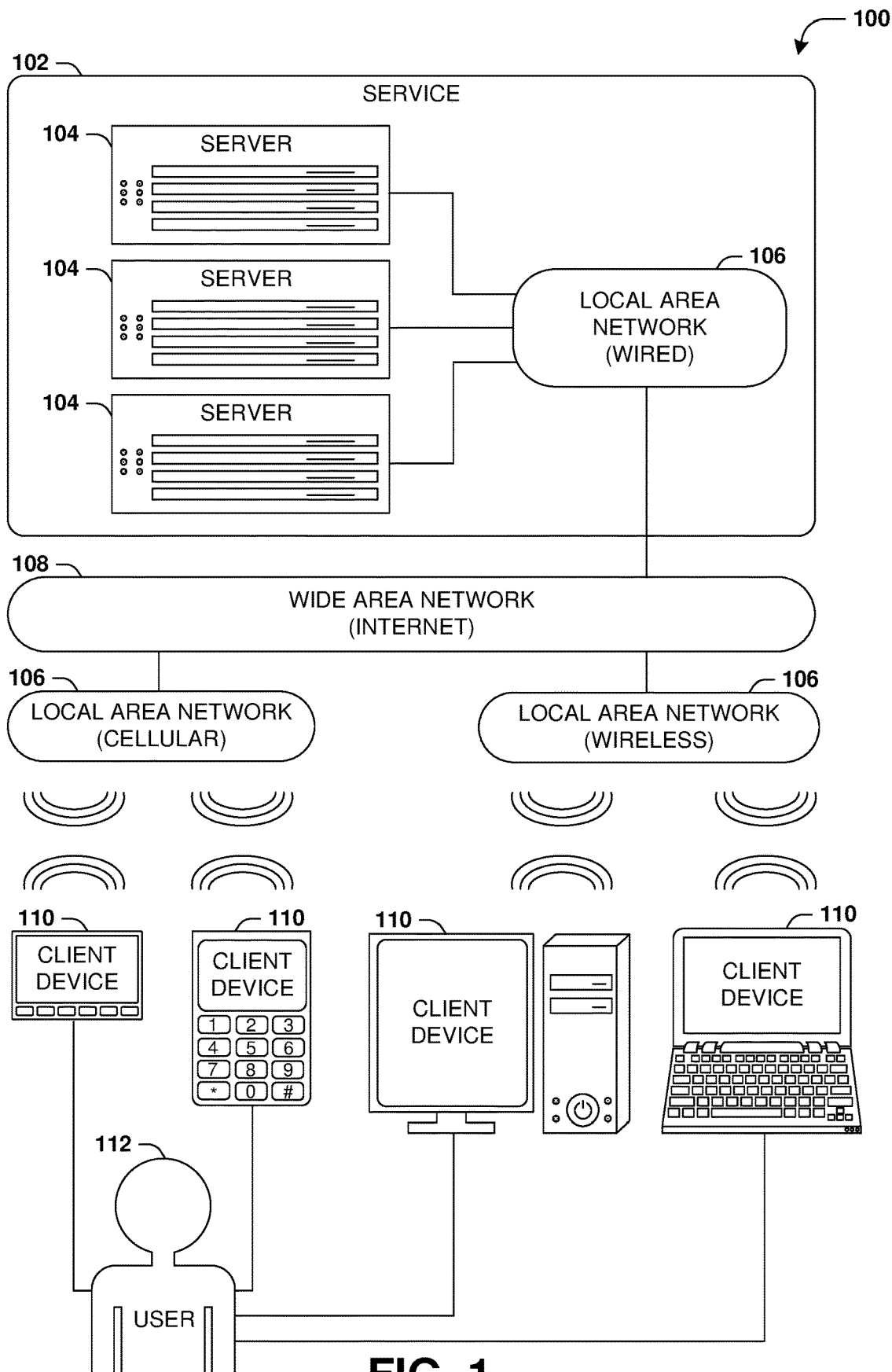
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
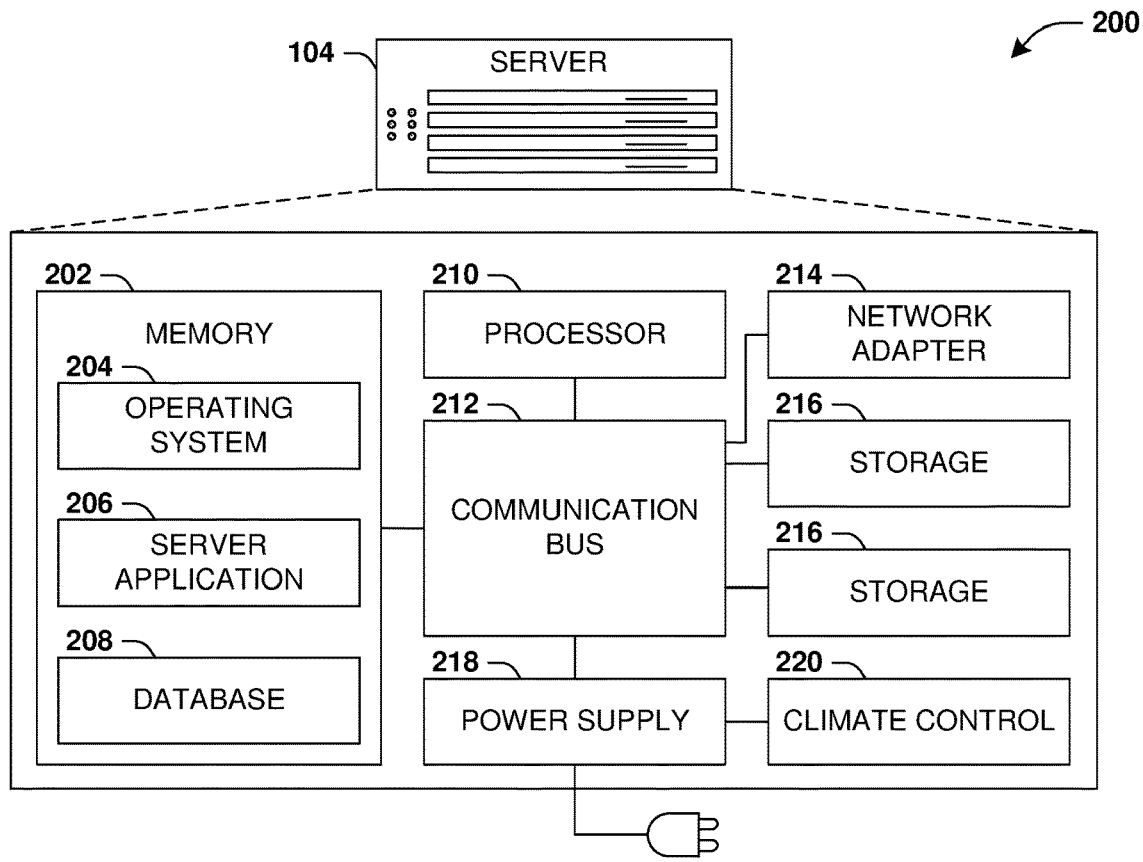
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
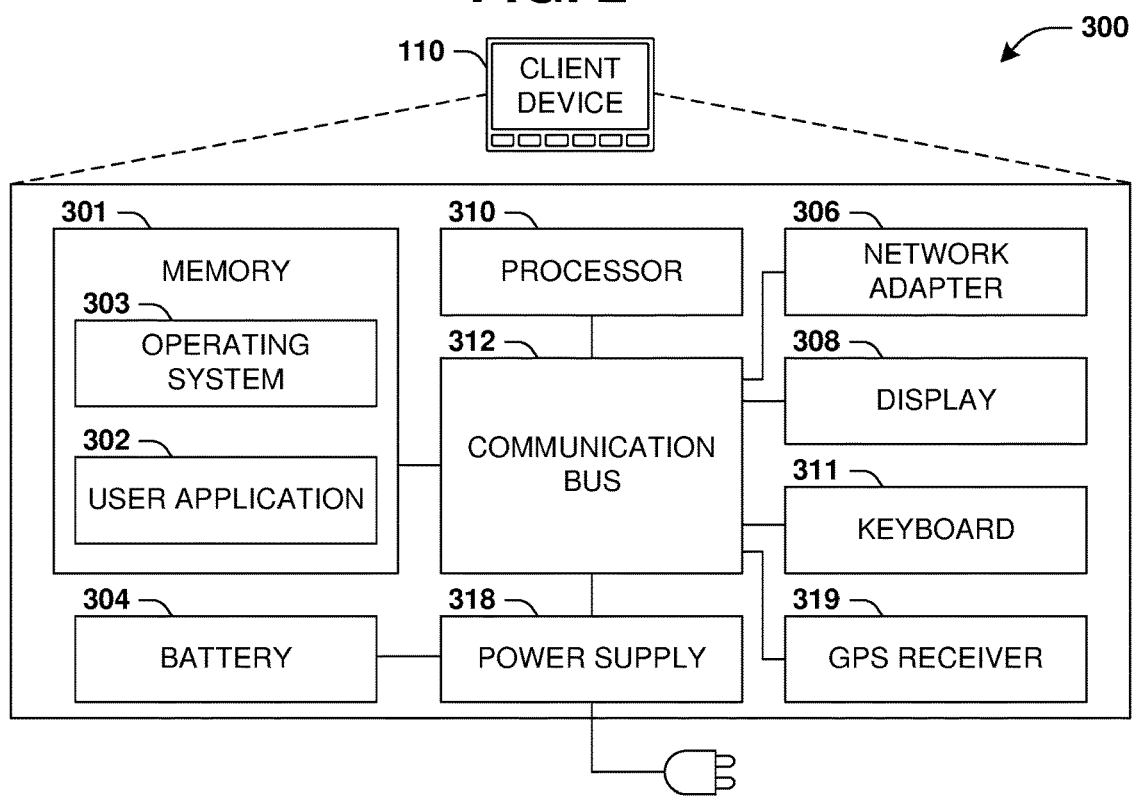
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for providing content sharing recommendations are provided. A user may share information and content through emails, text messages, social network posts, and/or a variety of other communication mediums. Certain content may be more appropriate, relevant, and/or interesting than other content for a current context of the user (e.g., work documents may be more relevant when the user is composing an email to a work manager; location and map content may be more relevant when responding to a friend that asked where the user is at; flight gate information may be more relevant to send to a spouse at the airport the day the user is landing; etc.). Unfortunately, the user may need to explicitly select content to share. The user may waste considerable time and computing resources to manually search for relevant content that may be stored on a local device, a remote device, a distributed computing environment (e.g., cloud storage), or a remote content provider such as a website. Thus, significant user effort and computing resource usage is needed to browse and search distributed content, bring relevant content to a device through which the content will be shared, etc. The user may even forego sending or responding to communication because the user may be unable to locate relevant content.

Accordingly, as provided herein, content sharing recommendations may be automatically created and provided to the user based upon a context (e.g., a context of the user, a context associated with other users, etc.) and content accessible to the user. If content is stored within a remote device or from a remote content provider, then such content may be automatically retrieved to a local device through which the content is to be shared. In this way, user effort and/or computing resources wasted by the user when otherwise manually searching and retrieving relevant content may be mitigated. A user may take affirmative action, such as providing opt-in consent, to allow access to and/or use of signals (e.g., a location of the user, a calendar entry, device sensor information such as camera data, a contact list, etc.) and/or content (e.g., an email, a file, a photo, etc.), such as for the purpose of constructing content sharing recommendations (e.g., where the user responds to a prompt regarding the collection and/or use of such information). The user may also opt-out from providing access to such information and/or data or portions thereof (e.g., access may be provided to a calendar, but not to real-time microphone audio from a microphone of a mobile device).

Figure 4:
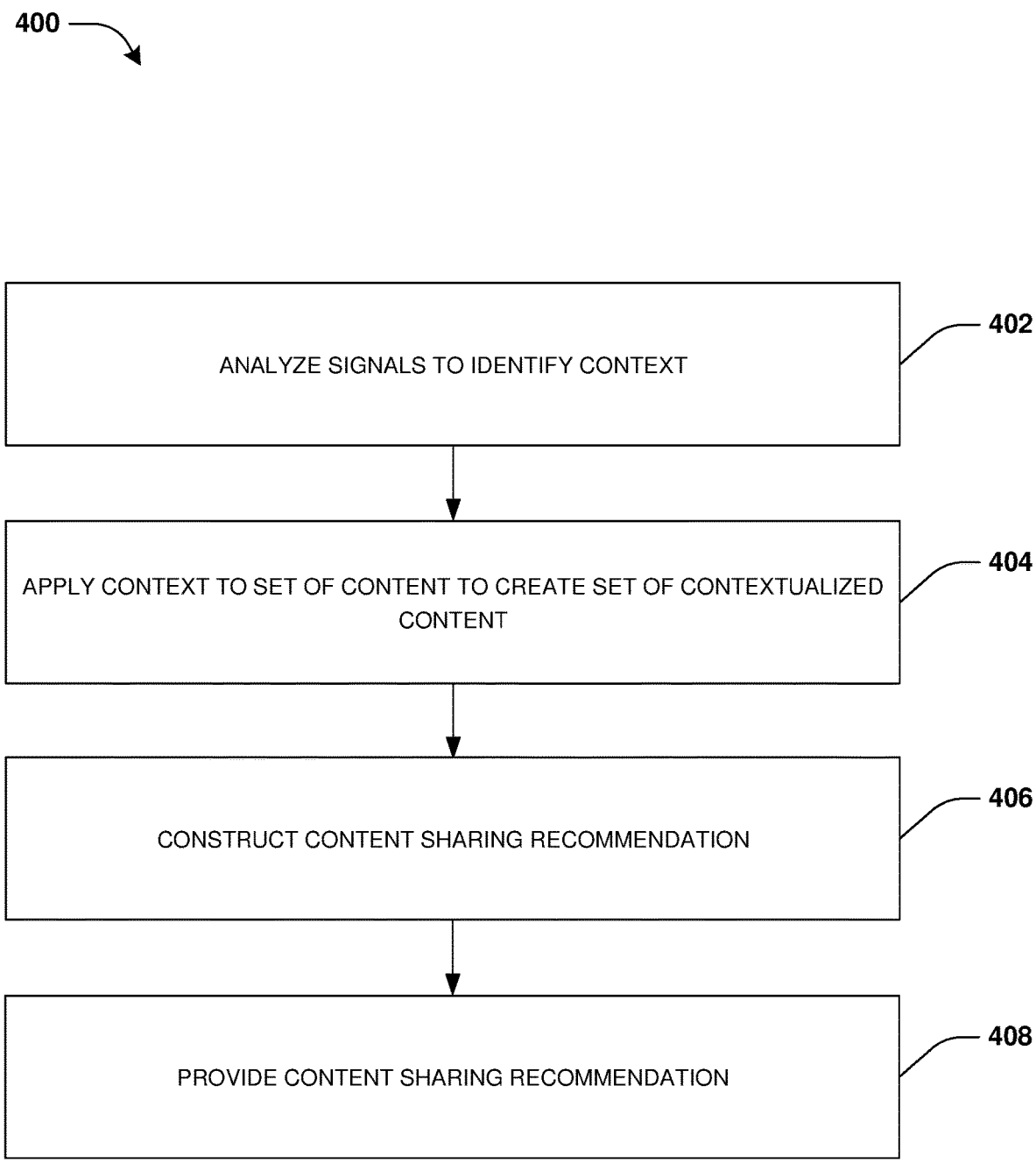
FIG. 4 is a flow chart illustrating an example method for providing content sharing recommendations.

An embodiment of providing content sharing recommendations is illustrated by an example method 400 of FIG. 4. At 402, signals may be analyzed to identify a context (e.g., a context relevant to the user, a context relevant to other users such as potential content sharing recipients, etc.). The signals may comprise a current user location signal (e.g., global positioning system (GPS) data of a device being carried by the user), an event occurrence signal (e.g., a content provider, such as a news website, may be crawled to identify events being reported out by the content provider), a current user activity signal (e.g., a camera, microphone, and an accelerometer may indicate that the user is driving a car), a time signal (e.g., a current time provided by the device), and/or a variety of other signals, such as a contacts list (e.g., Jon is the user's boss, Mary is the user's spouse, etc.), a message being composed by the user (e.g., the user is writing an email to Mary about a house paint color), content recently created by the user (e.g., the user may have just captured a video of an accident while waiting at a traffic light), etc. The context may be indicative of what type of information may be relevant to the user and/or potential recipients (e.g., while on vacation, a vacation photo may be more relevant for the user to share with friends than a work document).

It may be appreciated that as used herein, a context associated with the user, may correspond to a context directly or indirectly relevant to the user and/or other users (e.g., a context that may materially impact someone, such as a friend or contact of the user). For example, the signals may be analyzed to identify the context as being associated with one or more additional users, such as a potential content sharing recipient. For example, the user may be driving north bound on an expressway. The user may see a south bound car accident that is creating south bound congestion. Even though the south bound car accident might not affect the user, a context of the south bound car accident may be identified (e.g., a microphone of a vehicle navigation unit may identify the user describing the south bound car accident) for creating content sharing recommendations with other users, such as south bound drivers.

At 404, the context may be applied to a set of content, available to the user, to create a set of contextualized content. For example, content may be contextualized as an inference for how relevant the content is to the context of the user (e.g., how relevant the vacation photo is to share with friends while the user is on vacation compared to sharing the work document). In this way, contextualized content may be ranked as to how relevant, appropriate, and/or interesting such contextualized content is to the given context and/or a given recipient (e.g., contextual rankings of content may change as the context of the user changes, such as from when the user enters a car to when the user enters a stadium, and/or for different recipients, such as sending a message to a spouse compared to sending the message to a landscaper because different content may be more or less relevant given certain contexts and recipients). The set of content may comprise user generated content of a local device (e.g., images on a mobile phone), content retrievable from a remote device of the user (e.g., work files on a work laptop), content retrievable from a remote content provider (e.g., a webpage, a social network post, etc.), etc.

The set of content may be processed using a text analysis module (e.g., natural language processing functionality, optical character recognition functionality, and/or other text parsing, feature extraction, and/or content subject matter determination functionality that may be used to extract features and/or characterize content based upon text of the content). The set of content may be processed using an image analysis module (e.g., image recognition functionality may be used to evaluate an image to identify features such as a person being depicted within the image, an activity being performed within the image, a location of the image, etc.). The set of content may be processed using an audio analysis module (e.g., speech recognition functionality may be used to process audio data to identify features, such as a subject matter of the audio data, a person, place, or thing mentioned in the audio data, etc.). The set of content may be processed using a video analysis module (e.g., visual features, aural features, temporal features, recognized actions and activities, etc. may be extracted from a video). Metadata of the content may be processed using a metadata analysis module (e.g., a location and/or time at which a photo was captured; a creation date of a text document; etc.). In this way, subject matter of the content may be identifiable for determining how relevant the subject matter is to the context of the user and/or recipients.

In an example where the user is performing an activity (e.g., composing a message, writing a blog, engaging in a phone conversation, etc.), a first signal may be identified as the user engaging in the activity (e.g., the user may write to a spouse, "I am really hungry, what should we eat tonight"). A first context (e.g., features may be extracted from a subject, a message recipient, and/or a message body of the message, which may be indicative of the first context that the user wants to plan dinner with the spouse) may be applied to the content based upon the first signal (e.g., a map of nearby restaurants may be more relevant to the dinner planning than a report card email attachment of an email received by the user, and thus may be ranked higher than the report card email attachment). A second signal, occurring subsequent to the first signal, may be identified as the user continuing to engage in the activity (e.g., the user may continue to write "I am really hungry, what should we eat tonight? Never mind, I just remembered we have leftovers. More importantly, I received Johnny's report card and we should discuss . . . "). A second context (e.g., the user's concern about discussing Johnny's report card) may be applied to the content based upon the second signal (e.g., the report card email attachment may be more relevant to the concern about discussing Johnny's report card than the map of nearby restaurants, and thus may be ranked higher than the map of nearby restaurants).

At 406, responsive to contextualized content exceeding a threshold (e.g., highest ranked contextualized content), a content sharing recommendation for content of the contextualized content (e.g., the report card email attachment) may be constructed. In an example, the report card email attachment may be pre-fetched from a device with access to the report card email attachment or may be fetched upon an indication from the user that the user is following through with the content sharing recommendation.

In an example, the context may be applied to a set of potential recipients to create a set of contextualized potential recipients (e.g., a contact list, such as an email address list, may be evaluated to see which contacts would find the report card email attachment relevant, useful, and/or appropriate). Responsive to a contextualized potential recipient (e.g., the spouse, Johnny's tutor, etc.) having a recipient relevancy exceeding a recipient threshold (e.g., a highest ranked recipient), the content sharing recommendation may be constructed to comprise the contextualized potential recipient as a recipient for the content.

At 408, the content sharing recommendation may be provided to the user for sharing with the recipient. For example, a user interface may be populated with the content or a description of the content. The user interface may be populated with message sending functionality (e.g., the ability to compose a new message with the content, the ability to respond to a message using the content, etc.). In an example, if the user is composing a message, then the user interface may be displayed while the user is composing the message (e.g., the user interface may provide functionality for the user to attach the content to the message). In another example, the content sharing recommendation may be provided as an email, a mobile alert, an audio message, a video message, a social network message, etc. In an example, any number of content sharing recommendations may be generated and provided to the user (e.g., content sharing recommendations for content associated with a top N number of contextualized content within the set of contextualized content).

In an example, the user may have an automatic sharing relationship with a second user (e.g., the user and the second user may join a driving condition club where drivers can share driving conditions with nearby drivers). Accordingly, the content may be shared with the second user based upon the contextualized content having the contextual relevancy exceeding the threshold with respect to the second user (e.g., a photo of an accident may be highly relevant to the second user that is driving near the user). The content may be automatically shared without user intervention or may be shared after the user has accepted a share confirmation.

In an example, contextual analysis functionality, used for evaluating the signals, and/or content recommendation functionality, used for determining whether to construct content sharing recommendations, may be updated based upon whether the user shared or did not share the content of the content sharing recommendation. For example, weights applied to features (e.g., a relevancy weight of a report card to a spouse; a relevancy weight of a vacation photo to a work manager; a relevancy weight of a car photo to a friend; etc.) used by the contextual analysis functionality and/or the content recommendation functionality to contextualize content and/or select contextualized content to recommend may be increased when the user shares the content or decreased when the user doesn't share the content. In another example, a sharing activity associated with the user sharing or receiving shared content may be monitored (e.g., the user is sharing funny cat memes with friends on a daily basis). The contextual analysis functionality and/or content recommendation functionality may be updated based upon the sharing activity (e.g., weights applied to funny cat memes may be increased for friends as recipients). In this way, the construction of content sharing recommendations may be improved.

Figure 5A:
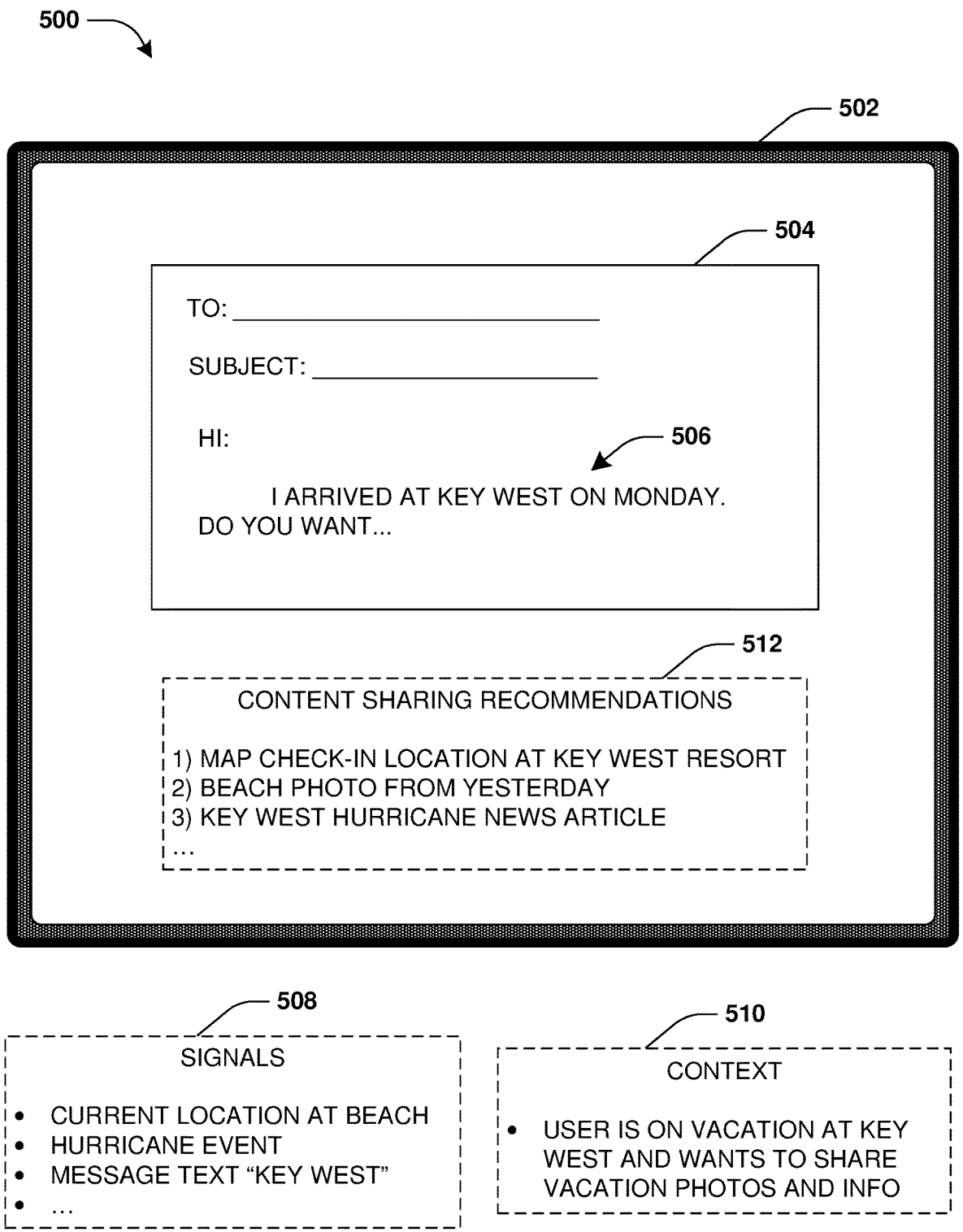
FIG. 5A is a component block diagram illustrating an example system for providing content sharing recommendations, where a set of content sharing recommendations are provided.
Figure 5B:
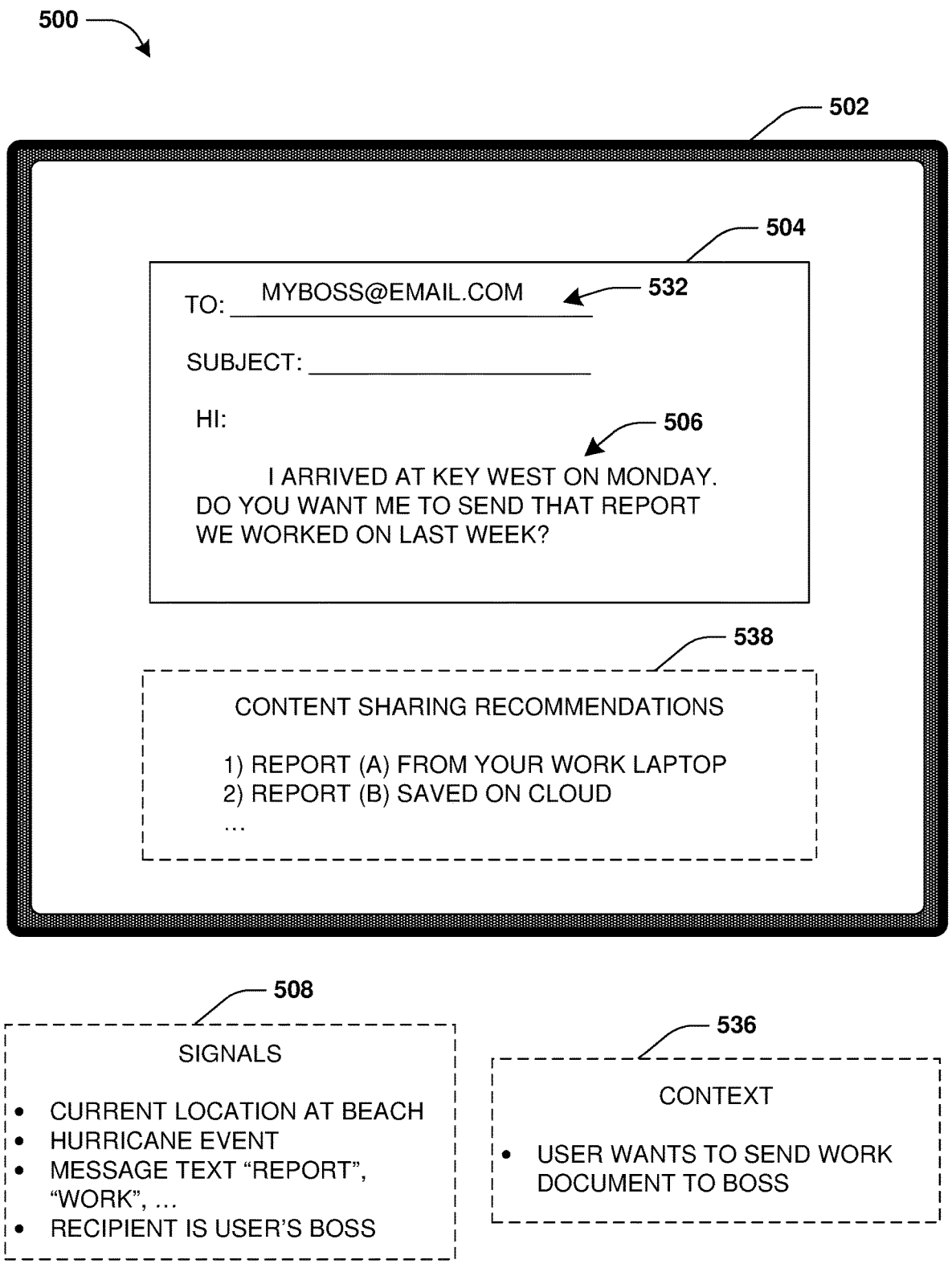
FIG. 5B is a component block diagram illustrating an example system for providing content sharing recommendations, where a new set of content sharing recommendations are provided.

FIGS. 5A-5B illustrate examples of a system 500 for providing content sharing recommendations. FIG. 5A illustrates a user composing an email 504 using a local computing device 502. The user may type the text "I arrived at Key West on Monday. Do you want . . . " into an email body 506 of the email 504. The message text of the email body 506, a current location of the local computing device 502 as being at a beach, a hurricane event identified from a local news service, and/or other information may be identified as signals 508 indicative of a context 510 that the user is on vacation at Key West and wants to share vacation photos and information with a recipient, such as a friend Jane. The context 510 may be applied to a set of content available to the user (e.g., content on the local computing device 502, content on a remote computing device of the user, content available from a remote content provider) to create a set of contextualized content having contextual relevancy rankings indicative of how appropriate, relevant, and/or interesting such content is to the context 510 and/or particular recipients. For example, a map check-in location at a Key West Resort, a beach photo from yesterday, and a Key West hurricane news article may have contextual relevancy rankings above a threshold for the context 510, while a funny cat meme and a work file may have relatively low relevancy rankings. Accordingly, content sharing recommendations 512, comprising the map check-in location, the beach photo, and the Key West hurricane news article, may be constructed and provided to the user. Responsive to the user selecting a content sharing recommendation, such as of the Key West hurricane news article, the Key West hurricane news article may be retrieved from a news content provider and attached to the email 504.

FIG. 5B illustrates the user continuing to compose the email 504. For example, the user may add new text "me to send that report we worked on last week?" to the email body 506, and may add a recipient email address 532 "myboss@email.com" to the email 504. The new text and the recipient email address 532 may be added to the signals 508. The signals 508 may be evaluated, such as the new text and the recipient email address 532, to identify a new context 536 that the user wants to send a work document to a boss. Content may be contextualized using the new context 536 based upon how appropriate, relevant, and/or interesting such content is to the new context 536 and the boss as a recipient. Accordingly, new content sharing recommendations 538, comprising a work report (A) on a remote work laptop and a work report (B) saved within cloud storage, may be constructed and provided to the user. Responsive to the user selecting a content sharing recommendation, such as of the work report (B), the work report (B) may be retrieved from the cloud storage and attached to the email 504.

Figure 6:
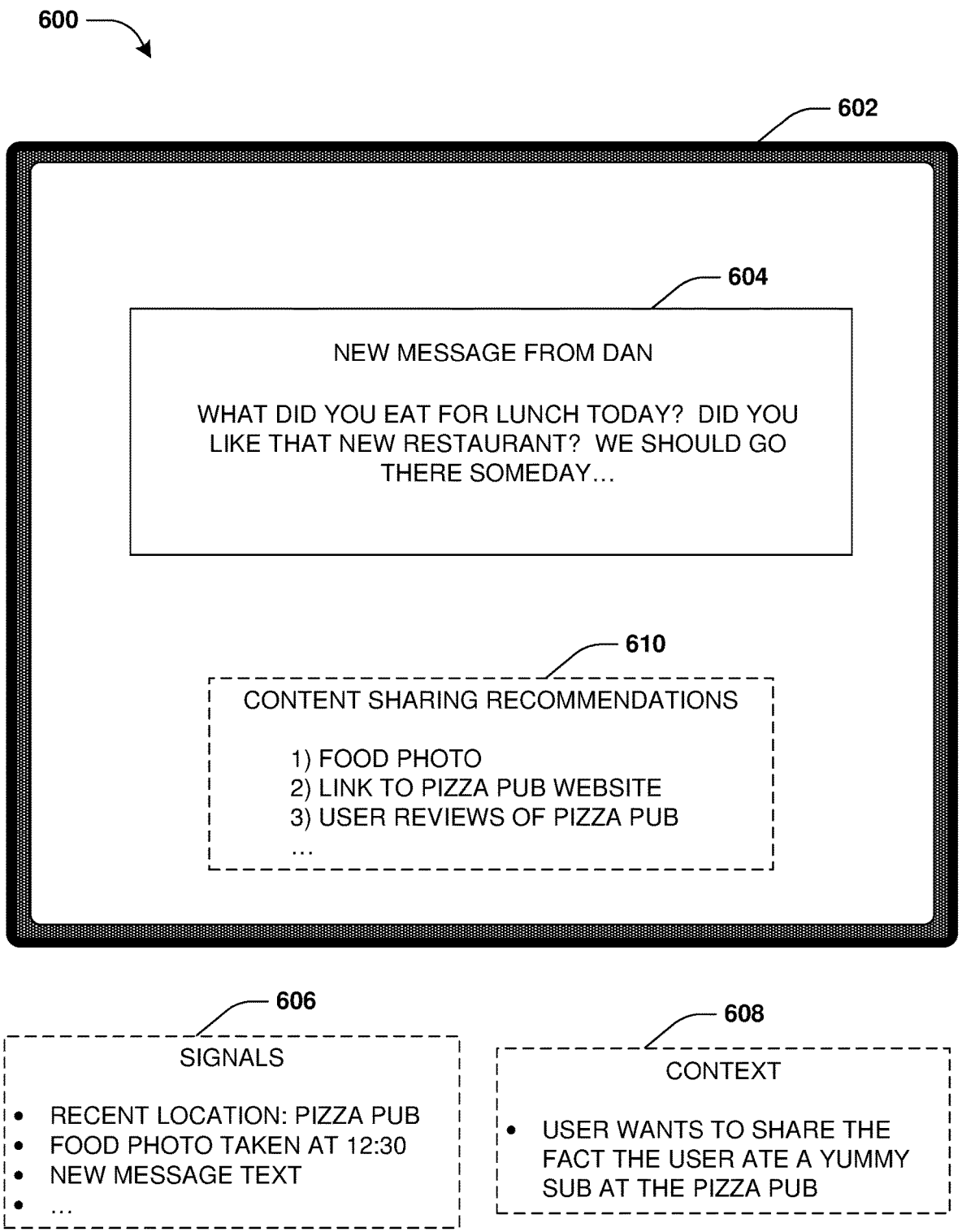
FIG. 6 is a component block diagram illustrating an example system for providing content sharing recommendations, where content sharing recommendations are provided for replying to a message received by a user.

FIG. 6 illustrates an example of a system 600 for providing content sharing recommendations. A user may receive a new message 604 "What did you eat for lunch today? Did you like that new restaurant? We should go there someday" from Dan on a local computing device 602. Signals 606, such as a recent location of the user being at a Pizza Pub, the user taking a photo of food at 12:30 pm, text of the new message 604, information about Dan (e.g., is Dan a friend, is Dan a coworker, Dan's location, Dan's age, etc.), etc., may be evaluated to determine a context 608 that the user wants to share the fact that the user ate a yummy sub at the Pizza Pub. The context 608 may be applied to content available to the user to create contextualized content indicative of how appropriate, relevant, and/or interesting such content is to the context 608 for responding back to Dan in response to the new message 604 from Dan (e.g., the food photo may be more relevant than a video of the user's cat skateboarding). Accordingly, content sharing recommendations 610, such as the food photo, a link to a Pizza Pub website, user reviews for the Pizza Pub, etc., may be provided to the user for composing a response message back to Dan. Responsive to the user selecting a content sharing recommendation, such as of the user reviews of the Pizza Pub, the user reviews may be retrieved from a restaurant review website and populated within a response message hosted within a messaging interface.

Figure 7:
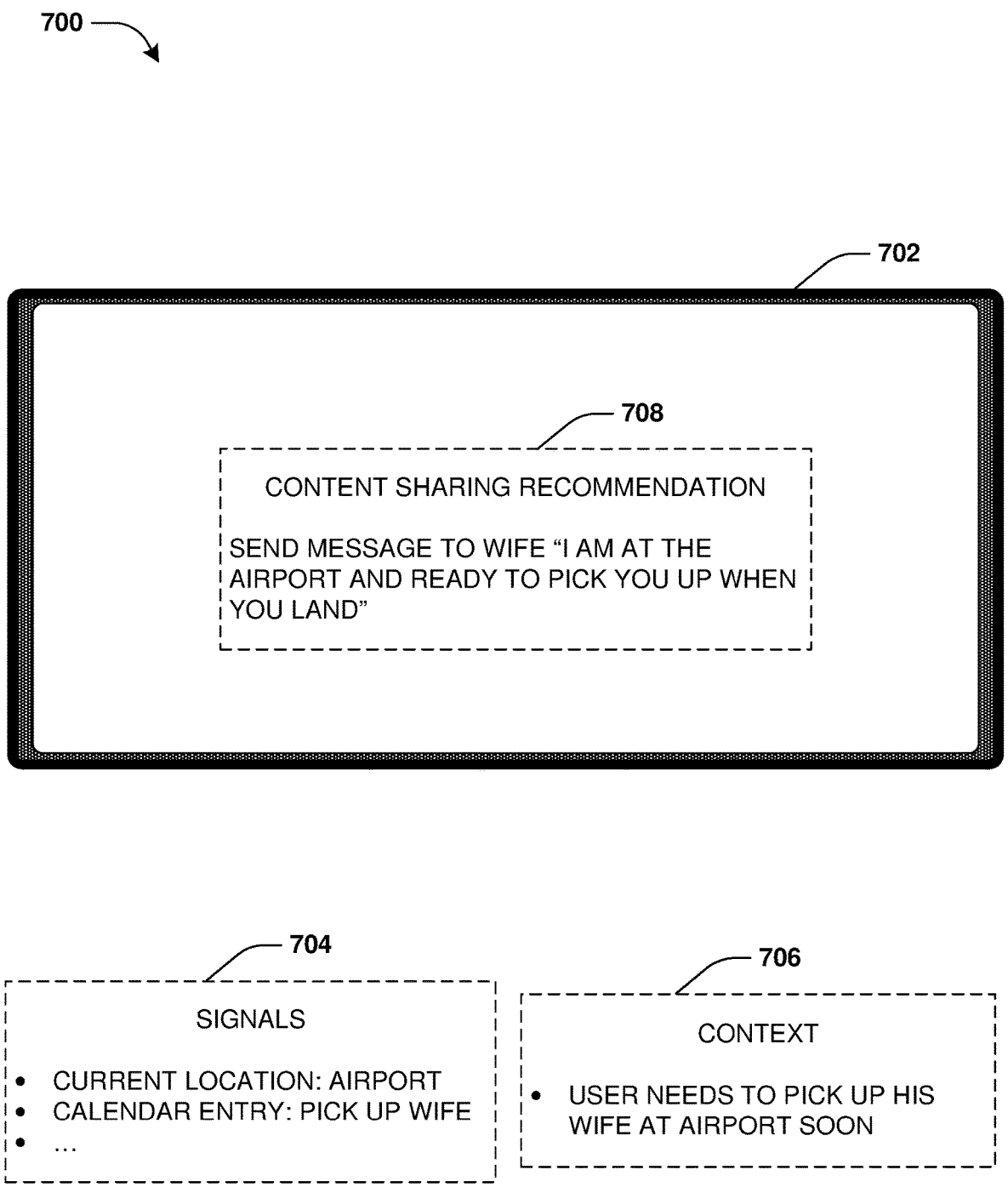
FIG. 7 is a component block diagram illustrating an example system for providing content sharing recommendations, where a content sharing recommendation is provided based upon a user entering an airport.

FIG. 7 illustrates an example of a system 700 for providing content sharing recommendations. A user, carrying a local computing device 702, may walk into an airport. A current location of the user being in the airport, a calendar entry "pick up wife", and/or other information may be identified as signals 704 associated with the user. The signals 704 may be evaluated to identify a context 706 that the user needs to pick up his wife at the airport soon. The context 706 may be applied to content available to the user to create contextualized content indicative of how appropriate, relevant, and/or interesting such content is to the context 706 for sharing with the spouse (e.g., a photo of the user at a bar with friends may be less relevant than a message indicating that the user is ready to pick up the spouse). For example, the content may be an auto generated text message "I am at the airport and ready to pick you up when you land" that is derived from the context 706. Accordingly, a content sharing recommendation 708, of the auto generated text message, may be provided to the user for composing a message to the spouse. Responsive to the user selecting the content sharing recommendation 708, a messaging comprising the auto generated text may be sent to the spouse.

Figure 8:
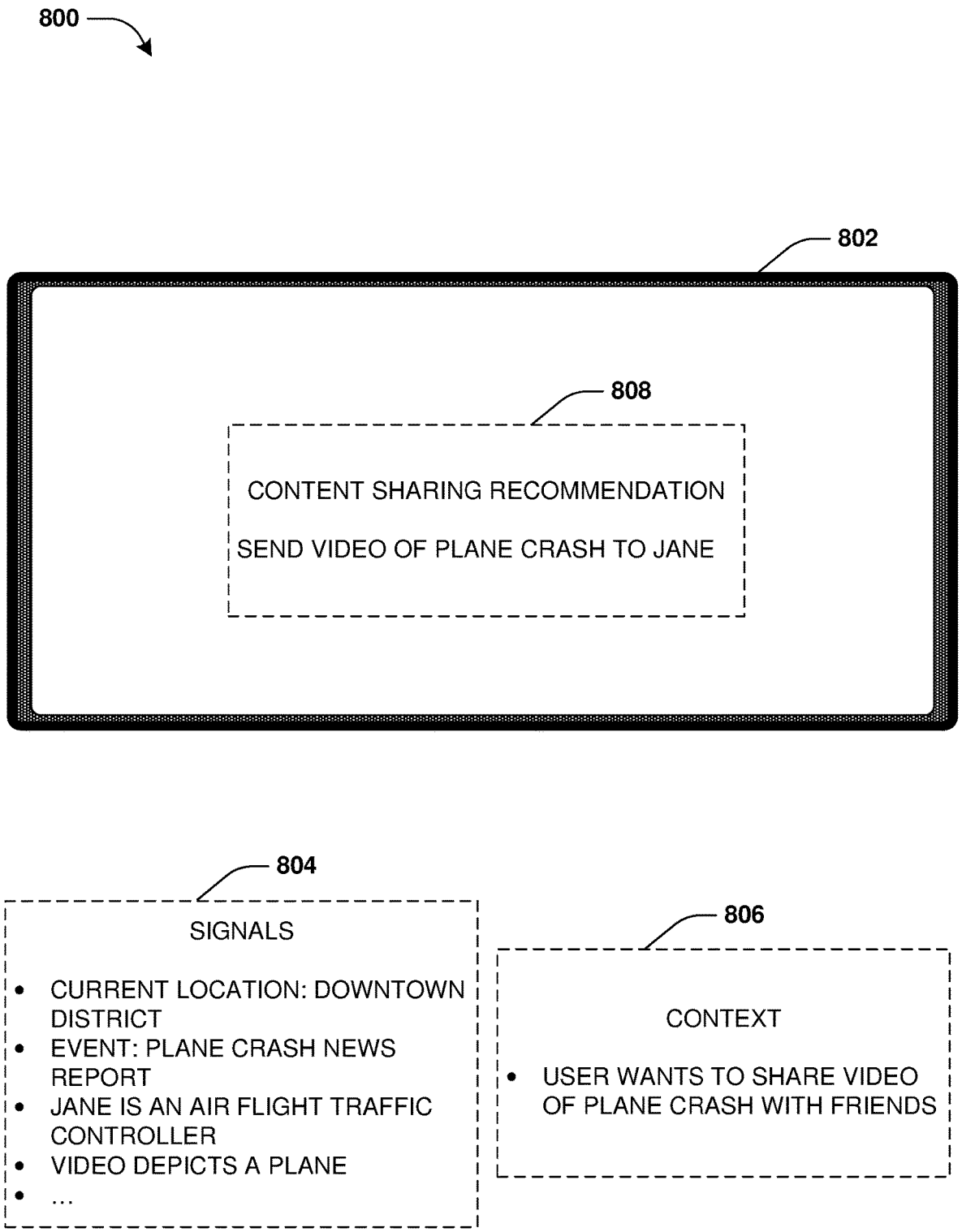
FIG. 8 is a component block diagram illustrating an example system for providing content sharing recommendations, where a content sharing recommendation is provided based upon a user being near a plane crash.

FIG. 8 illustrates an example of a system 800 for providing content sharing recommendations. A user, carrying a local computing device 802, may be within a downtown shopping district where a plane crash was recently reported (e.g., the plane crash may have occurred less than a quarter mile from a current location of the user). The current location of the user being in the downtown shopping district, a news article of an event occurrence of the plane crash in the downtown shopping district, a friend Jane being an air flight traffic controller, the user recently capturing a video depicting a plane, and/or other information may be identified as signals 804 associated with the user. The signals 804 may be evaluated to identify a context 806 that the user wants to share the video of the plane crash with friends. The context 806 may be applied to content available to the user to create contextualized content indicative of how appropriate, relevant, and/or interesting such content is to the context 806 (e.g., the plane crash video may be more interesting than a photo of food taken by the user last week because the user just witnessed the plane crash). In an example, the context 806 may be applied to potential recipients to create contextualized potential recipients indicative of how appropriate, relevant, and/or interesting certain content may be to such recipients (e.g., Jane, as an air traffic controller, may find the plane crash video very interesting). Accordingly, a content sharing recommendation 808, of sending the plane crash video to Jane, may be provided to the user. Responsive to the user selecting the content sharing recommendation 808, the plane crash video may be sent to Jane.

It may be appreciated that while the foregoing example provides a single sharing recommendation (e.g., send video of plane crash to Jane), in some embodiments multiple distinct content sharing recommendations may be presented and/or executed concurrently. For example, a set of content sharing recommendations may be constructed based upon contextual relevancies of contextualized content. For example, a first content sharing recommendation to share the plane crash video with Jane, a second content sharing recommendation to post the plane crash video to a social network, and a third content sharing recommendation to send a message to close friends and family that the user is uninjured may be presented for execution. For example, one or more of the content sharing recommendations may be automatically executed or may be selectively executed by the user.

Moreover, where multiple (unrelated) events occur concurrently, content sharing recommendations for each of the events may be presented and/or executed concurrently. For example, a user may receive a happy birthday text from a friend while exploring and taking photos of an art gallery. A first content sharing recommendation of a response message "thanks!" to reply back to the friend and a second content sharing recommendation of sharing a photo of the art gallery with an art student friend may be presented and/or executed concurrently.

Figure 9:
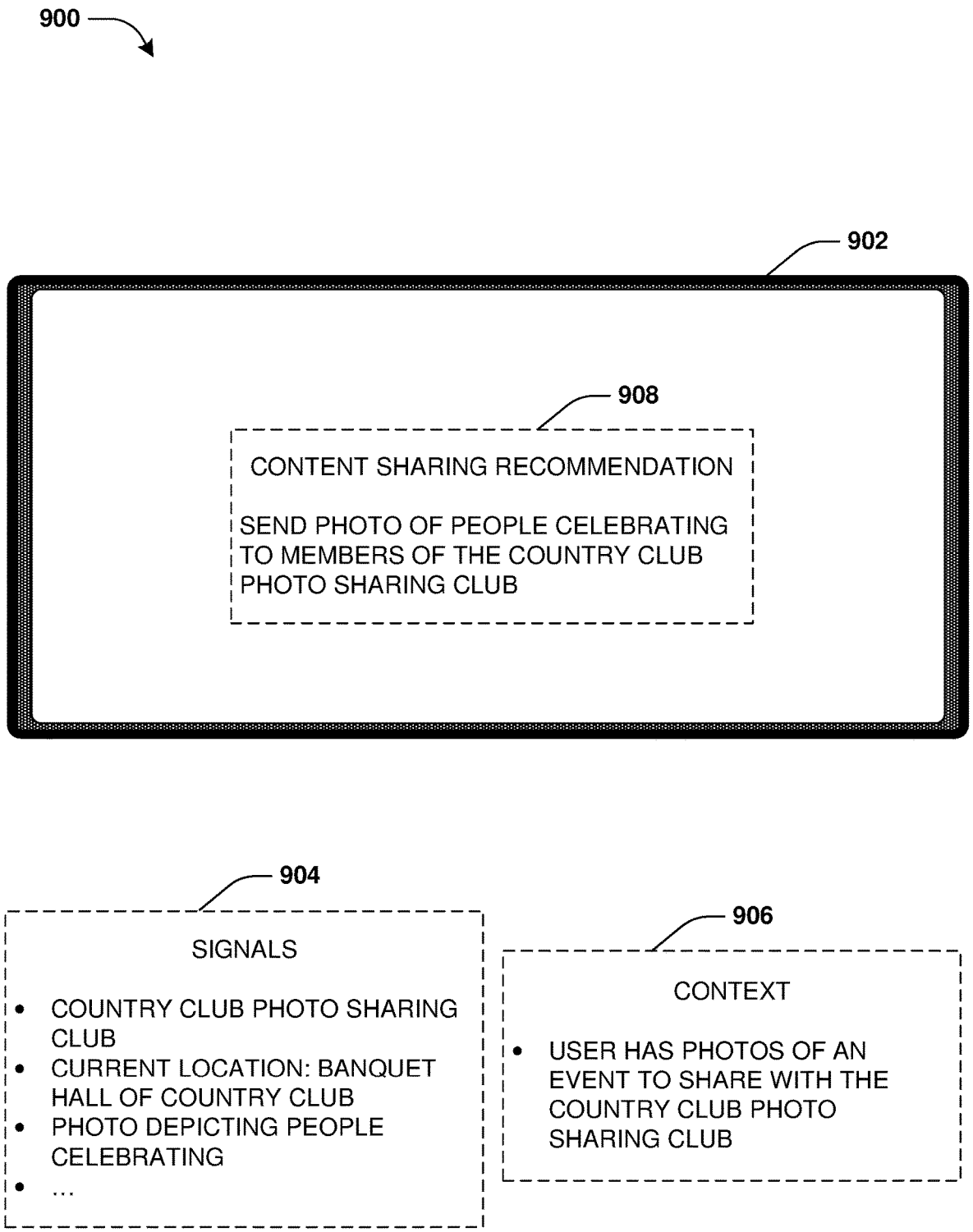
FIG. 9 is a component block diagram illustrating an example system for providing content sharing recommendations, where a content sharing recommendation is provided based upon a user being part of a photo sharing club.

FIG. 9 illustrates an example of a system 900 for providing content sharing recommendations. A user, carrying a local computing device 902, may be at a New Year's Eve party at a banquet hall of a country club. The current location of the user being at the banquet hall of the country club, the user being a member of a country club photo sharing club, the user recently capturing a photo of people celebrating, and/or other information may be identified as signals 904 associated with the user. The signals 904 may be evaluated to identify a context 906 that the user has photos of an event to share with the country club photo sharing club. The context 906 may be applied to content available to the user to create contextualized content indicative of how appropriate, relevant, and/or interesting such content is to the context 906 (e.g., the photo depicting the people celebrating may be more relevant than a family vacation photo for sharing with the country club photo sharing club). Accordingly, a content sharing recommendation 908, of sending the photo depicting the people celebrating to the members of the country club photo sharing club, may be provided to the user. Responsive to the user selecting the content sharing recommendation 908, the photo may be sent to the members.

Figure 10:
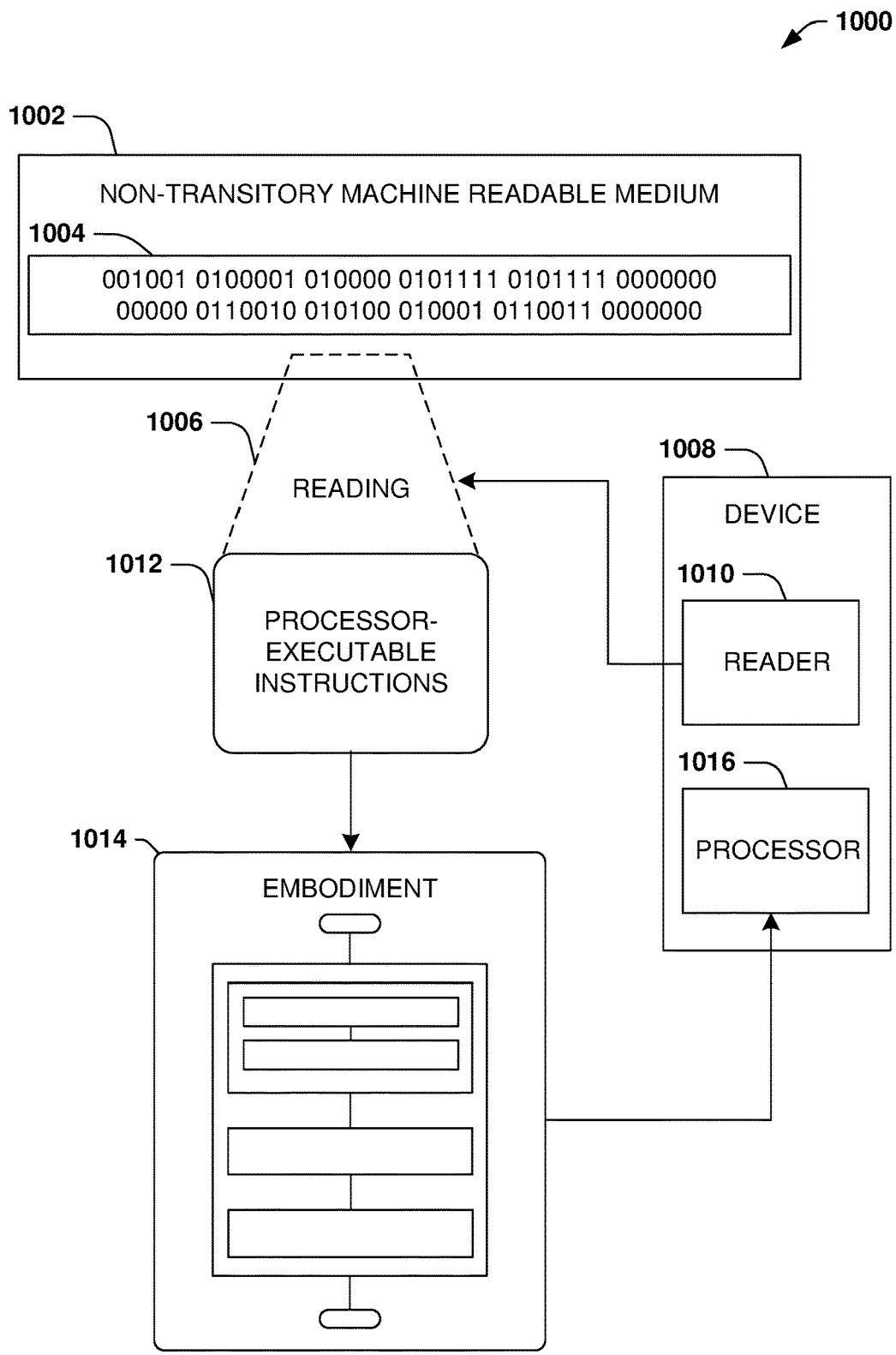
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 400 of FIG. 4, for example. In some embodiments, the processor-executable instructions 1012 are configured to cause implementation of a system, such as at least some of the example system 500 of FIGS. 5A-5B, at least some of the example system 600 of FIG. 6, at least some of the example system 700 of FIG. 7, example system 800 of FIG. 8, and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
analyzing signals to identify a context associated with a user, wherein the signals are based upon information comprised within an email message being composed, while the email message is being composed, by the user on a device being used by the user;
applying the context to a set of content, available to the user, to create a set of contextualized content;
applying the context to a set of potential recipients to create a set of contextualized potential recipients;
responsive to contextualized content, of the set of contextualized content, having a contextual relevancy exceeding a threshold, constructing a content sharing recommendation for content of the contextualized content, wherein the constructing comprises:
responsive to a contextualized potential recipient, of the set of contextualized potential recipients, having a recipient relevancy exceeding a recipient threshold, constructing the content sharing recommendation to comprise the contextualized potential recipient as a recipient for the content;
providing, while the email message is being composed by the user via an email composition interface, the content sharing recommendation of the content to the user for sharing with the recipient, wherein the content sharing recommendation is provided concurrently with the email composition interface; and
retrieving the content upon receiving a selection to share the content.

2. The method of claim 1, comprising:
attaching the content to the email message upon receiving the selection.

3. The method of claim 1, comprising:
updating contextual analysis functionality, used for evaluating the signals, based upon whether the user shared or did not share the content recommended through the content sharing recommendation.

4. The method of claim 1, comprising:
updating content recommendation functionality, used for determining whether to construct content sharing recommendations, based upon whether the user shared or did not share the content.

5. The method of claim 1, comprising:
monitoring sharing activity associated with the user sharing or receiving shared content; and
updating contextual analysis functionality and content recommendation functionality based upon the sharing activity.

6. The method of claim 1, wherein the signals correspond to location information of the device being used by the user.

7. The method of claim 1, wherein the retrieving the content comprises:
retrieving the content from a remote device different than the device being used by the user.

8. The method of claim 1, the signals comprising at least one of an event occurrence signal, a current user activity signal, a time signal, or a contacts list.

9. The method of claim 1, comprising:
responsive to determining that the user has an automatic sharing relationship with a second user, sharing the content with the second user based upon the contextualized content having the contextual relevancy exceeding the threshold with respect to the second user.

10. The method of claim 9, the sharing the content with the second user comprising:
presenting a share confirmation to the user;
responsive to the user accepting the share confirmation, sharing the content; and
responsive to the user not accepting the share confirmation, refraining from sharing the content.

11. The method of claim 1, wherein the constructing comprises:
constructing a set of content sharing recommendations, for presentation to the user for selective execution of content sharing recommendations, based upon contextual relevancies of one or more contextualized content.

12. The method of claim 1, wherein the analyzing signals comprises:
analyzing the signals to identify the context as being associated with one or more additional users.

13. A computing device comprising:
a processor; and
memory comprising processor-executable instructions that when executed by the processor cause performance of operations, the operations comprising:
determining that a user is composing, using a device, an email message to a second user;
analyzing signals to identify a context associated with the user, wherein the signals are based upon information comprised within the email message being composed, while the email message is being composed, by the user on the device;
applying the context to a set of content, available to the user, to create a set of contextualized content;
responsive to contextualized content, of the set of contextualized content, having a contextual relevancy exceeding a threshold, constructing a content sharing recommendation for content of the contextualized content;
providing, while the email message is being composed by the user via an email composition interface, the content sharing recommendation of the content to the user for inclusion within the email message, wherein the content sharing recommendation is provided concurrently with the email composition interface; and
retrieving the content and attaching the content to the email message upon receiving a selection to share the content.

14. The computing device of claim 13, wherein the operations comprise:
identifying a first signal as the user engaging in preparing the email message; and
applying a first context to the content based upon the first signal.

15. The computing device of claim 14, wherein the operations comprise:
identifying a second signal, occurring subsequent to the first signal, as the user continues to prepare the email message; and
applying a second context to the content based upon the second signal.

16. A non-transitory machine readable medium having stored thereon processor-executable instructions that when executed cause performance of operations, the operations comprising:
analyzing signals to identify a context associated with a user, wherein the signals are based upon information comprised within an email message being composed, while the email message is being composed, by the user on a device being used by the user;

applying the context to a set of content, available to the user, to create a set of contextualized content;

applying the context to a set of potential recipients to create a set of contextualized potential recipients;

responsive to contextualized content, of the set of contextualized content, having a contextual relevancy exceeding a threshold, constructing a content sharing recommendation for content of the contextualized content, wherein the constructing comprises:

responsive to a contextualized potential recipient, of the set of contextualized potential recipients, having a recipient relevancy exceeding a recipient threshold, constructing the content sharing recommendation to comprise the contextualized potential recipient as a recipient for the content;

providing, while the email message is being composed by the user via an email composition interface, the content sharing recommendation of the content to the user for sharing with the recipient; and retrieving the content upon receiving a selection to share the content.

17. The non-transitory machine readable medium of claim 16, wherein the operations comprise:

monitoring sharing activity associated with the user sharing or receiving shared content; and updating contextual analysis functionality and content recommendation functionality based upon the sharing activity.

18. The non-transitory machine readable medium of claim 16, wherein the operations comprise:

updating content recommendation functionality, used for determining whether to construct content sharing recommendations, based upon whether the user shared or did not share the content.

19. The non-transitory machine readable medium of claim 16, wherein the operations comprise:

responsive to determining that the user has an automatic sharing relationship with a second user, sharing the content with the second user based upon the contextualized content having the contextual relevancy exceeding the threshold with respect to the second user.

20. The non-transitory machine readable medium of claim 16, wherein the operations comprise:

presenting a share confirmation to the user;

responsive to the user accepting the share confirmation, sharing the content; and responsive to the user not accepting the share confirmation, refraining from sharing the content.

* * * * *